(12) United States Patent
Wang et al.

(10) Patent No.: US 12,381,826 B1
(45) Date of Patent: *Aug. 5, 2025

(54) NETWORK PORT CHARACTERIZATION

(71) Applicant: Juniper Networks, Inc., Sunnyvale, CA (US)

(72) Inventors: Jisheng Wang, Palo Alto, CA (US); Xiaoying Wu, Sunnyvale, CA (US); Swapnil Rajkumar Kura, Pune (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,890

(22) Filed: Dec. 29, 2023

Related U.S. Application Data

(63) Continuation of application No. 17/304,723, filed on Jun. 24, 2021, now Pat. No. 11,882,046.

(Continued)

(51) Int. Cl.
*H04L 47/2441* (2022.01)
*H04L 12/18* (2006.01)
(Continued)

(52) U.S. Cl.
CPC ...... *H04L 47/2441* (2013.01); *H04L 12/1886* (2013.01); *H04L 12/44* (2013.01);
(Continued)

(58) Field of Classification Search
CPC ..... H04L 12/1886; H04L 12/44; H04L 41/12; H04L 41/16; H04L 43/0882; H04L 47/2441

See application file for complete search history.

(56) References Cited

U.S. PATENT DOCUMENTS

| | | | |
|---|---|---|---|
| 6,772,207 B1 * | 8/2004 | Dorn | H04L 9/40 714/39 |
| 6,987,740 B1 * | 1/2006 | Di Benedetto | H04L 45/48 370/255 |

(Continued)

FOREIGN PATENT DOCUMENTS

| | | | |
|---|---|---|---|
| CN | 101902390 A | | 12/2010 |
| CN | 101902390 B | * | 4/2013 |
| CN | 109951466 A | | 6/2019 |

OTHER PUBLICATIONS

Nguyen et al. A Survey of Techniques for Internet Traffic Classification using Machine Learning, IEEE Communications Surveys &Tutorials, vol. 10, No. 4, Fourth Quarter 2008 (Year: 2008).*

(Continued)

*Primary Examiner* — Ayaz R Sheikh
*Assistant Examiner* — David Zhijun Sun
(74) *Attorney, Agent, or Firm* — Shumaker & Sieffert, P.A.

(57) ABSTRACT

An example method includes receiving, from a network device, data indicating characterizations of network traffic on a plurality of ports of the network device; determining, by processing circuitry, for each port of the plurality of ports, an indicator of a port type for the port based on the data indicating the characterizations of network traffic on the plurality of ports, wherein the port type indicates a link type of network traffic exchanged by the port; and outputting, by the processing circuitry, the indicator of the port type to an output device.

20 Claims, 12 Drawing Sheets

Related U.S. Application Data

(60) Provisional application No. 63/057,125, filed on Jul. 27, 2020.

(51) Int. Cl.
*H04L 12/44* (2006.01)
*H04L 41/12* (2022.01)
*H04L 41/16* (2022.01)
*H04L 43/0882* (2022.01)

(52) U.S. Cl.
CPC ............ *H04L 41/12* (2013.01); *H04L 41/16* (2013.01); *H04L 43/0882* (2013.01)

(56) References Cited

U.S. PATENT DOCUMENTS

| | | | |
|---|---|---|---|
| 11,882,046 B1 | 1/2024 | Wang et al. | |
| 2014/0153442 A1* | 6/2014 | Zhang | H04L 41/26 370/255 |
| 2014/0169196 A1* | 6/2014 | Kay | H04L 63/1408 370/252 |
| 2016/0119183 A1* | 4/2016 | Gopalarathnam | H04L 41/30 370/254 |
| 2019/0215228 A1* | 7/2019 | Ramachandran | H04L 67/04 |

OTHER PUBLICATIONS

Prosecution History from U.S. Appl. No. 17/304,723, dated Apr. 19, 2023 through Sep. 27, 2023, 39 pp.

* cited by examiner

|        | EVENT 1 | EVENT 2 | EVENT 3 | EVENT 4 | EVENT 5 | EVENT 6 | EVENT 7 | RANK AVG | RANK 1 PCNTG |
|--------|---------|---------|---------|---------|---------|---------|---------|----------|--------------|
| PORT 1 | 1 | 2 | 1 | 2 | 1 | 1 | 1 | 1.2857 | 0.71 |
| PORT 2 | 2 | 1 | 2 | 4 | 2 | 2 | 2 | 2.1429 | 0.14 |
| PORT 3 | 3 | 3 | 3 | 3 | 3 | 3 | 3 | 3.1429 | 0.00 |
| PORT 4 | 4 | 4 | 4 | 1 | 4 | 4 | 4 | 3.4286 | 0.14 |

FIG. 2B

NETWORK PORT CHARACTERIZATION

RELATED APPLICATIONS

This application is a continuation of U.S. patent application Ser. No. 17/304,723, filed Jun. 24, 2021, which claims the benefit of U.S. Provisional Patent Application No. 63/057,125, filed Jul. 27, 2020, the entire content of each application is incorporated herein by reference.

FIELD

The disclosure relates generally to computer networks and, more specifically, characterization of ports of a network device.

BACKGROUND

Multi-port network devices, such as switches are in common use in computer networks. A network switch, for example, provides network connectivity between multiple devices by passing packet traffic received on one port of the switch to one or more other ports of the switch. A multi-port network device can vary in the number of ports it supports. For example, devices having 5, 8, 10, 16, 24, 28, 48, or 52 ports are relatively common.

SUMMARY

Managing device configuration in a network can be challenging. Changing configurations can be error prone and require costly support from staff to diagnose and resolve issues that may occur. In some cases, a desirable configuration of network device or a port of a multi-port network device can be dependent on the type of network traffic to be transmitted and received via the network device or port on the network device. Network administrators typically rely on manual documentation of network device configuration. However, this documentation can become out of date, and therefore may be undependable.

In general, the disclosure describes techniques to characterize network traffic exchange by ports of a multi-port network device with other network devices and systems. The techniques include receiving data that characterizes network traffic exchanged by ports of a multi-port network device. The data can include rankings with respect to different measurements such as number of transmitted packets, number of received packets, etc. The data can also include rank averages and rank percentages. Further, the data can include ratios such as ratios of multicast to unicast packets. This data can be used to characterize the link type of the network traffic carried by the port. For example, the port can be characterized as an uplink port to a larger network, a link to a single user workstation, a link to a server such as a file server or email server etc.

The techniques disclosed herein can be provided as part of a practical application such as a classification system that can be part of, or used with, a network administration system. The techniques can provide advantages over current systems. For example, the techniques can provide accurate and up to date characterization of network traffic over a port. The characterization can be used by network administrators to appropriately configure the port such that the port configuration is optimized for the type of network traffic carried by the port.

In one example, this disclosure describes a method that includes receiving, from a network device, data indicating characterizations of network traffic on a plurality of ports of the network device; determining, by processing circuitry, for each port of the plurality of ports, an indicator of a port type for the port based on the data indicating the characterizations of network traffic on the plurality of ports, wherein the port type indicates a link type of network traffic exchanged by the port; and outputting, by the processing circuitry, the indicator of the port type to an output device.

In another example, this disclosure describes a classification system that includes one or more processors; and a memory storing instructions, that when executed, cause the one or more processors to: receive, from a network device, data indicating characterizations of network traffic on a plurality of ports of the network device; determine, for each port of the plurality of ports, an indicator of a port type for the port based on the data indicating the characterizations of network traffic on the plurality of ports, wherein the port type indicates a link type of network traffic exchanged by the port; and output the indicator of the port type to an output device.

In another example, this disclosure describes a computer-readable storage medium having stored thereon instructions, that when executed, cause one or more processors to: receive, from a network device, data indicating characterizations of network traffic on a plurality of ports of the network device; determine, for each port of the plurality of ports, an indicator of a port type for the port based on the data indicating the characterizations of network traffic on the plurality of ports, wherein the port type indicates a link type of network traffic exchanged by the port; and output the indicator of the port type to an output device.

The details of one or more examples are set forth in the accompanying drawings and the description below. Other features, objects, and advantages will be apparent from the description and drawings, and from the claims.

BRIEF DESCRIPTION OF THE FIGURES

FIG. 2B is a table illustrating an example calculation of certain fields of the example message portion of FIG. 2A in accordance with one or more aspects of the disclosure.

DETAILED DESCRIPTION

Figure 1:
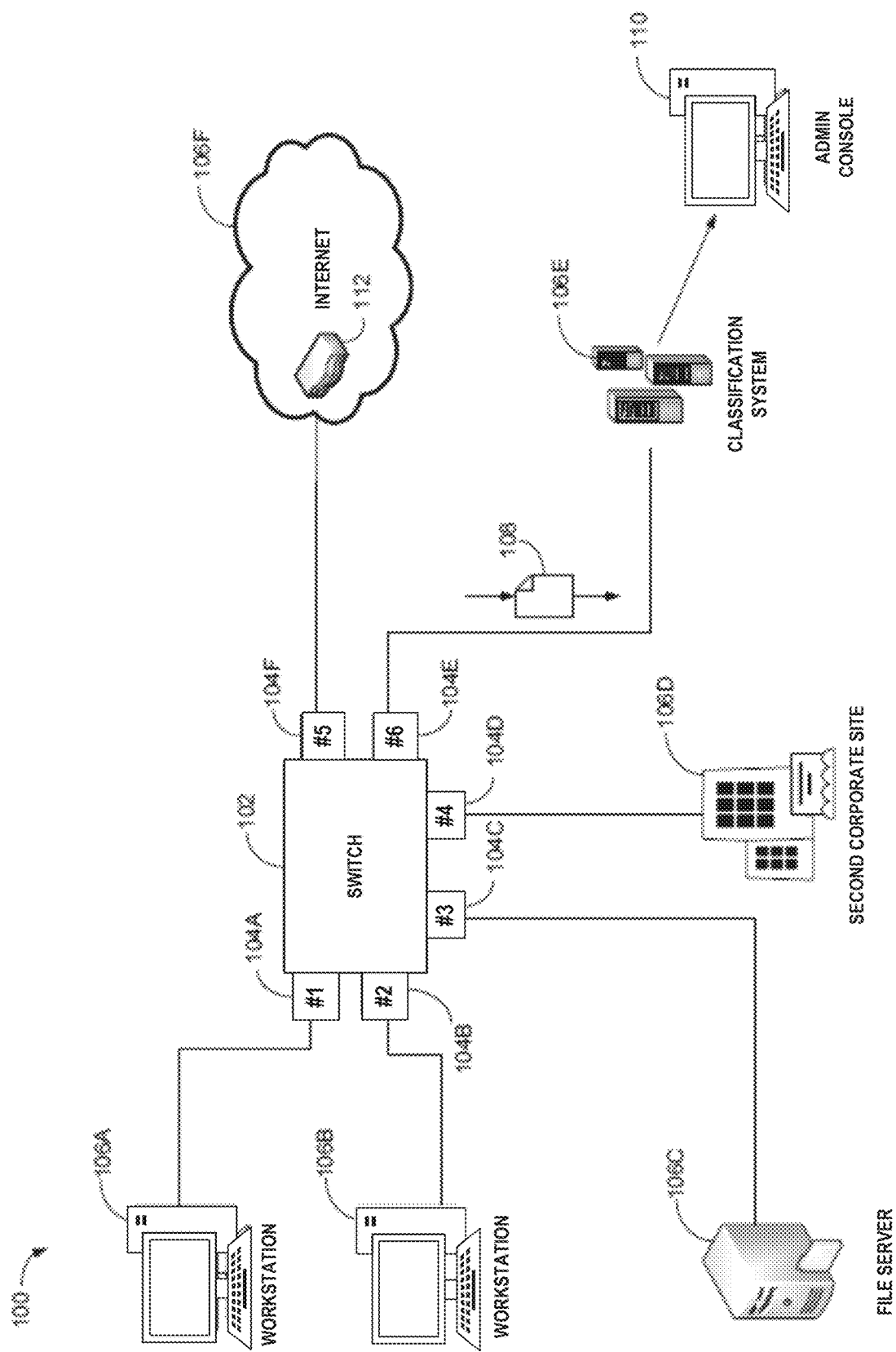
FIG. 1 is an overview diagram of an example network system in accordance with one or more aspects of the disclosure.

FIG. 1 is an overview diagram of an example network system 100 in accordance with one or more aspects of the disclosure. FIG. 1 shows a multi-port network device 102 in the form of a switch. Other types of multi-port network devices can include routers, wireless access points, or other network devices. Multi-port network device 102 includes a plurality of network ports labeled as network port 104A, network port 104B, network port 104C, network port 104D, network port 104E, and network port 104F. In the example shown in FIG. 1, each of the network ports 104A-F can be connected to a separate device. Network port 104A is connected to a first workstation 106A. Network port 104B is connected to a second workstation 106B. Network port 104C is connected to a file server 106C. Network port 104D is connected to a second corporate site, or a router located at the second corporate site 106D. Network port 104E is connected to a classification system 106E. Network port 104F is connected to a network, such as the Internet 106F via a router 112. The classification system 106E is in communication with an administrative console 110. The classification system 106E receives from the switch, traffic information 108 from the multi-port network device 102. The traffic information 108 includes characterizations of network traffic flowing over one or more of the network ports 104A-F.

These characterizations can be utilized by the classification system 106E to identify a type of communication flowing over one or more of the network ports 104A-F. Some embodiments of the classification system 106E utilize a machine leaning model to determine a type of communication flowing over one or more of the network ports 104A-F, based on the traffic information 108. Information relating to these characterizations can be displayed by the administrative console 110. In some embodiments, one or more remedial actions can be performed based on the characterizations.

While FIG. 1 shows a single multi-port network device 102, some embodiments of the classification system 106E receive different sets of traffic information 108 from each of a plurality of network switches or other multi-port network devices, each of the plurality of network switches communicating, via their respective set of traffic information 108, characterizations of traffic flowing over ports of the respective switch. Furthermore, while this disclosure generally describes characterization of traffic passed over multiple ports of a switch, some of the disclosed embodiments characterize traffic passed by other types of devices. For example, some embodiments characterize port types of a router, cache, proxy server, firewall, or other network device.

Figure 2A:
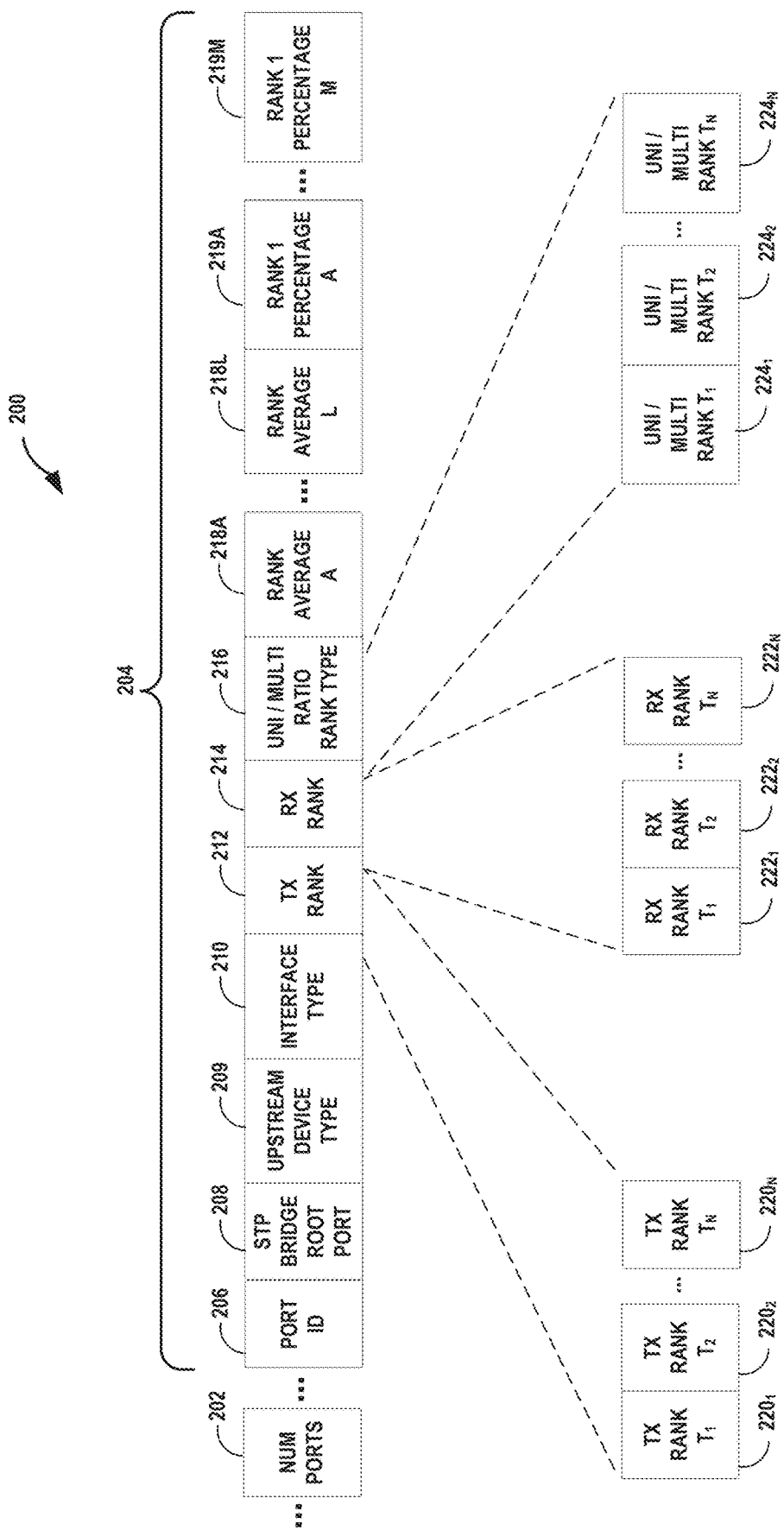
FIG. 2A is conceptual view of an example message portion in accordance with one or more aspects of the disclosure.

FIG. 2A is conceptual view of an example message portion 200 in accordance with one or more aspects of the disclosure. Multi-port network device 102 can transmit messages that include traffic information 108 (FIG. 1). Multi-port network device 102 discussed above with respect to FIG. 1 can transmit a message including one or more of the fields of the message portion 200 shown in the example illustrated in FIG. 2A to classification system 106E, also discussed above with respect to FIG. 1. The message portion 200 includes a number of ports field 202. The number of ports field 202 defines a number of ports for which information is provided by the message portion 200. For example, in some embodiments, a switch transmitting the message portion 200 includes a traffic information section 204 in the message portion 200 for each port implemented by the switch. Thus, a switch including eight ports can generate a message portion 200 with a number of ports field 202 indicating eight (8) ports, and then repeat the traffic information section 204 eight times, once for each of the eight ports.

In some aspects, a traffic information section 204 can include a port identifier field 206, Spanning Tree Protocol (STP) bridge root port field 208, upstream device type field 209, interface type field 210, transmit rank field 212, receive rank field 214, unicast/multicast ratio rank field 216, rank averages 218A-218M and rank one percentages 219A-219M. The port identifier field 206 uniquely identifies a particular port on a switch transmitting the message portion 200. Thus, for example, if the switch includes eight ports, the port identifier field 206 is set to a unique value for each traffic information section 204 included in the message portion 200. In some embodiments, the unique values are one, two, three, four, five, six, seven, and eight, each value uniquely identifying a particular port on the eight port switch. The STP bridge root port field 208 is a Boolean indication of whether the port (identified via field 206) is a root port of a spanning tree. In some embodiments, the STP bridge root port field 208 value is determined based on a spanning tree protocol. The upstream device type field 209 indicates a device type of a network device coupled to the multi-port network device 102 via the network port 104. For example, with respect to network port 104B of the multi-port network device 102 discussed above with respect to the example network system 100 shown in FIG. 1, the upstream device type field 209 indicates, in some embodiments, that the upstream device type is a workstation. With respect to network port 104D, the upstream device type field 209 indicates, for example, a router (not shown in FIG. 1, but a router is frequently an interface to a second corporate site, such as second corporate site 106D). Some embodiments utilize the link layer discovery protocol (LLDP) to determine the upstream device type. For example, in some embodiments, the multi-port network device 102 implements the LLDP protocol to determine the upstream device type, then communicates this information to the classification system 106E as part of the traffic information 108.

The interface type field 210 identifies a type of physical interface of the identified port (e.g., via port ID field 206) of the switch. Example interface types include one or more of gigabit Ethernet, fast ethernet, token ring, 10 Gigabit Ethernet, Fiber Distributed Data Interface (FDDI), Asynchronous Transfer Mode (ATM) or LocalTalk, among others.

The transmit rank field 212 indicates a rank of the identified port (e.g., via port ID field 206) with respect to an amount of data transmitted during a measurement period. In some embodiments, the measurement period is one of 30 seconds, one minute, two minutes, five minutes, 10 minutes, 30 minutes, one hour, two hours, or any time period. In some embodiments, the amount of data transmitted is measured based on a number of bytes transmitted or a number of packets transmitted. Some embodiments include overhead data, such as TCP/UDP/IP packet headers in the amounts, while other embodiments exclude this data from the calculations. In some aspects, transmit rank field 212 can include a plurality of transmission rankings over a plurality of previous measurement periods. For example, FIG. 2A shows the transmit rank field 212 comprised of multiple ranking fields $220_1$-$220_n$. The multiple ranking fields $220_1$-$220_n$ are for measurement periods $T_1$-$T_n$. In some aspects, the ranking field $220_n$ can represent a most recent ranking during a most recent measurement period. Other rankings included in the transmit rank field 212 represent progressively less recent rankings. Thus, a sequence of message portions 200 transmitted by a network switch (e.g., multi-port network device 102) to a classification system (e.g., classification system 106E) may include a moving window of rankings, with a least recent ranking 220 dropping off the transmit rank field 212 and a new ranking 220 being included in each subsequent message portion 200 transmitted by the network switch to the classification system.

The receive rank field 214 indicates a rank of the identified port (e.g., via port ID field 206) with respect to an amount of data received during a measurement period. Similar to the transmit rank field 212, some embodiments of the receive rank field 214 include a plurality of receive rankings over a plurality of measurement periods. This plurality of receive rankings are represented in FIG. 2A as receive rank fields $222_1$-$222_n$. As discussed above with respect to the transmit rank fields $220_1$-$220_n$, the receive rank fields $222_1$-$222_n$ represent, in some embodiments, a sequence of receive rankings during sequential measurement periods. The receive rank field $222_n$ is a most recent receive rank, in some embodiments, while the receive rank field $222_1$ is a least recent receive rank in some embodiments. Thus, as discussed above with respect to the transmit rank field 212, in some embodiments, sequential message portions 200 transmitted from the multi-port network device 102 to the classification system 106E include a moving window of rankings, with a least recent ranking being excluded from a particular message portion 200 relative to a previous message portion 200, and a most recent ranking being added relative to the previous message portion 200.

The unicast/multicast ratio rank field 216 indicates a ranking of a ratio of unicast traffic to multi-cast traffic. Similar to the transmit rank field 212 and receive rank fields 214, the unicast/multicast ratio rank field 216 considers, in various embodiments, an amount of unicast/multi-cast data or a number of unicast/multicast packets when computing the ratio. In some embodiments, the ratio includes overhead data such as protocol headers while other embodiments, the ratio excludes overhead data. The ratio of the particular port (e.g., indicated by port id field 206 of a particular traffic information section 204) is then ranked relative to other ports of the multi-port network device 102 transmitting the message portion 200. Some embodiments of the unicast/multicast ratio rank field 216 include a plurality of rankings for a plurality of measurement time periods. This plurality of rankings is illustrated via fields $224_1$-$224_n$ of FIG. 2. Similar to the transmit rank field 212 and receive rank field 214, a most recent ranking is represented by field $224_n$ of FIG. 2A, and a least recent ranking is represented by field $224_1$ of FIG. 2A. Sequential message portions 200 transmitted by a multi-port network device 102 (e.g., a switch, router, etc.) to a classification system (e.g., classification system 106E) can thus include a moving window of unicast/multicast ratio rankings.

Rank average fields 218A-218L indicate the average rank of the port identified in the port ID field 206 over measurement periods $T_1$-$T_n$ with respect to I different measurements of network traffic. In some aspects, each port can be ranked with respect to one or more of the/different measurements. Examples of such measurements can include values referred to as rxpkt_rank_avg, txpkt_rank_avg, rx_upkt_rank_avg, tx_upkt_rank_avg, rx_root_avg, tx_root_avg, tx_rx_root_avg, rx_ucast_root_avg, tx_ucast_root_avg, and tx_rx_ucast_root_avg.

In some aspects, multi-port network device 102 determines rxpkt_rank_avg by ranking each port based on "packets received" value of the port at each event across all interfaces of the multi-port network device 102. Multi-port network device 102 determines the value of rxpkt_rank_avg for a port as the average of ranks of the port across all events considered in the aggregation duration window (hour\three hour\day etc.).

In some aspects, multi-port network device 102 determines txpkt_rank_avg by ranking each port based on a "packets transmitted" value of the port at each event across all interfaces of the multi-port network device 102. Multi-port network device 102 determines the value of txpkt_rank_avg for a port as the average of ranks of the port across all events considered in the aggregation duration window (hour\three hour\day etc.).

In some aspects, multi-port network device 102 determines rx_upkt_rank_avg by ranking each port based on a "unicast packets received" value of the port at each event across all interfaces of the multi-port network device 102. Multi-port network device 102 determines the value of rx_upkt_rank_avg for a port as the average of ranks of the port across all events considered in the aggregation duration window (hour\three hour\day etc.).

In some aspects, multi-port network device 102 determines tx_upkt_rank_avg by ranking each port based on a "unicast packets transmitted" value of the port at each event across all interfaces of the multi-port network device 102. Multi-port network device 102 determines the value of tx_upkt_rank_avg for a port as the average of ranks of the port across all events considered in the aggregation duration window (hour\three hour\day etc.).

Multi-port network device 102 can determine if a port is considered a root with respect to received packets. In some aspects, a port is considered as a root with respect to received packets if a "packets received" value for the port is greater than or equal to a maximum value of "packets transmitted" of the other ports of the multi-port network device 102 in the same event. In some aspects, multi-port network device 102 sets a root value for the port to one (1) if the port is a root port. If the port is not a root port with respect to received packets, multi-port network device 102 sets the root value for the port to zero (0). Multi-port network device 102 can determine rx_root_avg as the average of root value of that port across all events considered in the aggregation duration window (hour\three hour\day etc.).

Multi-port network device 102 can determine if a port is considered a root with respect to transmitted packets. In some aspects, a port is considered as a root with respect to transmitted packets if a "packets transmitted" value for the port is greater than or equal to a maximum value of "packets received" of the other ports of the multi-port network device 102 in the same event. In some aspects, multi-port network device 102 sets a root value for the port to one (1) if the port is a root port. If the port is not a root port with respect to received packets, multi-port network device 102 sets the root value for the port to zero (0). Multi-port network device 102 can determine tx_root_avg as the average of root value of that port across all events considered in aggregation duration window (hour\three hour\day etc.).

In some aspects, multi-cast network device 102 can determine if a port is both a root port with respect to received packets and transmitted packets during the same event for the port. If so, multi-port network device can set a tx_rx_root value for the port to one (1), otherwise multi-port network device 102 can set the tx_rx_root value to zero (0). Multi-port network device 102 can determine tx_rx_root_avg value as the average of tx_rx_root value of that port across all events considered in aggregation duration window (hour\three hour\day etc.).

Multi-port network device 102 can determine if a port is considered a root with respect to received unicast packets. In some aspects, a port is considered as a root with respect to received packets if a "unicast packets received" value for the port is greater than or equal to a maximum value of "unicast packets transmitted" of the other ports of the multi-port network device 102 in the same event. In some aspects, multi-port network device 102 sets a root value for the port to one (1) if the port is a root port. If the port is not a root port with respect to received unicast packets, multi-port network device 102 sets the root value for the port to zero (0). Multi-port network device 102 can determine rx_ucast_root_avg as the average of root value of that port across all events considered in aggregation duration window (hour\three hour\day etc.).

Multi-port network device 102 can determine if a port is considered a root with respect to transmitted unicast packets. In some aspects, a port is considered as a root with respect to transmitted packets if a "unicast packets transmitted" value for the port is greater than or equal to a maximum value of "unicast packets received" of the other ports of the multi-port network device 102 in the same event. In some aspects, multi-port network device 102 sets a root value for the port to one (1) if the port is a root port. If the port is not a root port with respect to transmitted unicast packets, multi-port network device 102 sets the root value for the port to zero (0). Multi-port network device 102 can determine tx_ucast_root_avg as the average of root value of that port across all events considered in aggregation duration window (hour\three hour\day etc.).

In some aspects, multi-cast network device 102 can determine if a port is both a root port with respect to received unicast packets and transmitted unicast packets during the same event for the port. If so, multi-port network device can set a tx_rx_ucast_root value for the port to one (1), otherwise multi-port network device 102 can set the tx_rx_ucast_root value to zero (0). Multi-port network device 102 can determine tx_rx_ucast_root_avg value as the average of tx_rx_ucast_root value of that port across all events considered in aggregation duration window (hour\three hour\day etc.).

Rank one percentage fields 219A-219M indicate the percentage measurements where the port identified by the port ID field 206 was ranked first over measurement periods $T_1$-$T_n$ with respect to m different measurements of network traffic. In some aspects, each port can be ranked with respect to one or more of the m different measurements. Examples of such measurements will be referred to as rxpkt_rank_pct, txpkt_rank_pct, rx_upkt_rank_pct, and tx_upkt_rank_pct.

In some aspects, multi-port network device 102 determines rxpkt_rank_pct by ranking each port based on a "packets received" value of the port at each event across all interfaces of the multi-port network device 102. Multi-port network device 102 determines the value of rxpkt_rank_pct for a port as the number of events where the port is ranked first (1) for packets received divided by total events considered in aggregation duration window (hour\three hour\day etc.).

In some aspects, multi-port network device 102 determines txpkt_rank_pct by ranking each port based on a "packets transmitted" value of the port at each event across all interfaces of the multi-port network device 102. Multi-port network device 102 determines the value of txpkt_rank_pct for a port as the number of events where the port is ranked first (1) for packets transmitted divided by total events considered in aggregation duration window (hour\three hour\day etc.).

In some aspects, multi-port network device 102 determines rx_upkt_rank_pct by ranking each port based on a "unicast packets received" value of the port at each event across all interfaces of the multi-port network device 102. Multi-port network device 102 determines the value of rx_upkt_rank_pct for a port as the number of events where the port is ranked first (1) for unicast packets received divided by total events considered in aggregation duration window (hour\three hour\day etc.).

In some aspects, multi-port network device 102 determines tx_upkt_rank_pct by ranking each port based on a "unicast packets transmitted" value of the port at each event across all interfaces of the multi-port network device 102. Multi-port network device 102 determines the value of tx_upkt_rank_pct for a port as the number of events where the port is ranked first (1) for unicast packets transmitted divided by total events considered in aggregation duration window (hour\three hour\day etc.).

Other measurements or indicators may be used instead of, or in addition to the above-described measurements to characterize a network port. For example, in some aspects, a "remotecap" indicator may be used. The remotecap indicator indicates whether the port is connected to a bridge or bridge router. Such an indicator may be determined based on an LLDP.remote_system_capability field of LLDP data. A "bridge_port_count" field may be the number of ports on multi-port network device 102 that are connected to a bridge or bridge router (e.g., the number of ports for which remotecap is true).

FIG. 2B shows a table 250 illustrating an example calculation of a rank average and a rank percentage of the example message portion of FIG. 2A in accordance with one or more aspects of the disclosure. In the example shown in FIG. 2B, multi-port network device 102 has four ports. Each row in the table provides a ranking for the port over seven events with respect to one of the measurements described above with respect to FIG. 2A. The "RANK AVG" column indicates the average rank for the port. For example, the rank average for port one of multi-port network device 102 is 1.2847, which is the average of the ranks for port one across the seven events (e.g., ranks of 1, 2, 1, 2, 1, 1, 1). The "RANK 1 PCTNG" column indicates the percentage of events where the port was ranked number one with respect to the measurement. For example, the rank percentage for port one is 71% (0.71), which is determined based on port one being ranked one for five of the seven events.

Figure 3:
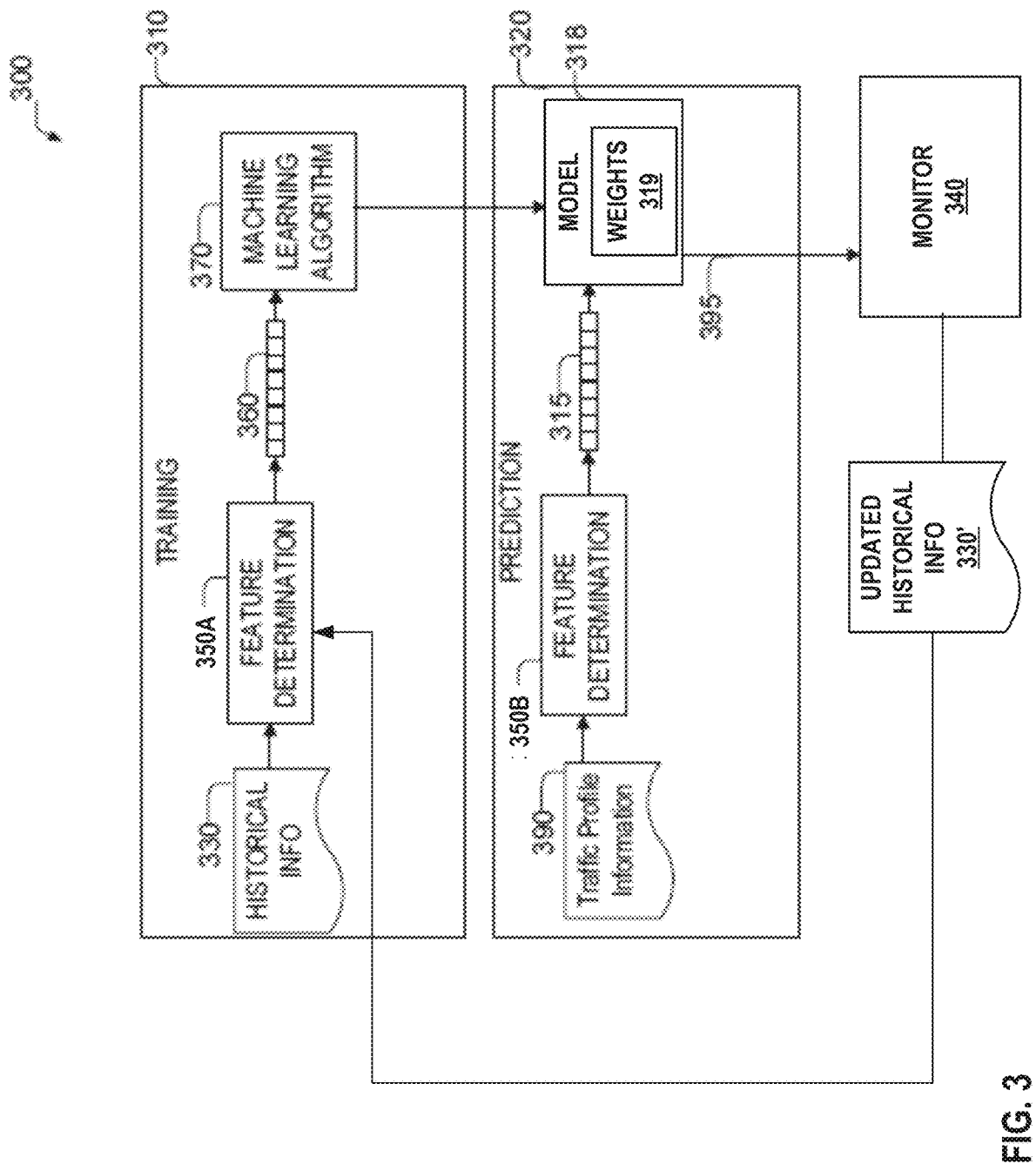
FIG. 3 shows an example machine learning module in accordance with one or more aspects of the disclosure.

FIG. 3 shows an example machine learning module 300 in accordance with one or more aspects of the disclosure. Machine learning module 300 utilizes a training module 310 and a prediction module 320. Training module 310 inputs historical information 330 into feature determination module 350A. The historical information 330 may be labeled. Example historical information may include one or more of the indications discussed above, such as a port identifier (e.g., via field 206), STP bridge root port indication (e.g., via field 208), interface type (e.g., via field 210), transmit rank (e.g., via field 212), receive rank (e.g., via field 214), unicast/multicast ratio (e.g., via field 216), rank average(s) (e.g., via fields 218A-218L), and rank one percentages (e.g., via fields 219A-219M). These indications are stored in a training library of communication statistics in some embodiments. Labels included in the training library indicate which link types are associated with which historical information.

Feature determination module 350A can determine one or more features 360 from this historical information 330. Stated generally, features 360 are a set of the information input and are determined to be predictive of a particular outcome. In some examples, the features 360 may be all the historical activity data, but in other examples, the features 360 may be a subset of the historical activity data. The machine learning algorithm 370 produces a model 318 based upon the features 360 and the labels.

In the prediction module 320, traffic profile information 390 may be input to the feature determination module 350B. The traffic profile information 390 in the disclosed embodiments include similar indications of that described above with respect to the historical information 330. However, the traffic profile information 390 provides these indications for network traffic activity at a particular multi-port network device (e.g., multi-port network device 102) and a particular port of the multi-port network device. Thus, when characterizing traffic at each port of a multi-port network device 102, the model 318 is invoked multiple times, once for each port, at least in some embodiments.

Feature determination module 350B may determine the same set of features or a different set of features from the traffic profile information 390 as feature determination module 350A determined from historical information 330. In some examples, feature determination module 350A and 350B are the same module. In some aspects, feature determination module 350B produces feature vector 315, which can be input into the model 318 to generate a probability vector 395, the details of which are discussed below with respect to FIG. 4. The training module 310 may operate in an offline manner to train the model 318. The prediction module 320, however, may be designed to operate in an online or near real-time manner. It should be noted that the model 318 may be periodically updated via additional training and/or user feedback. For example, in some aspects, a monitor 340 may monitor probability vector 395 to determine if the model 318 is providing consistent and/or substantially correct results. In some aspects, model consistency can be based on monitoring variation in uplink port detection. In production network devices, the uplink port typically does not change often. If the model continuously changes the port designated as an uplink port, it is an indicator that the model is inaccurate. Thus, model consistency can be based on the number of changes in uplink port designation being below a predetermined or configurable threshold. In some aspects, a user such as a network administrator may determine the model 318 is providing consistent and/or substantially correct results. If the performance of the model 318 degrades after it is deployed to prediction module 320, updated historical information 330' can be generated and sent to training module 310. The update historical information can be processed by feature determination module 350A and machine learning algorithm 370 to produce an updated model 318.

The machine learning algorithm 370 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, hidden Markov models, models based on artificial life, simulated annealing, and/or virology. Examples of unsupervised learning algorithms include expectation-maximization algorithms, vector quantization, and information bottleneck method. Unsupervised models may not have a training module 310. In an example embodiment, a logistic regression model is used and the model 318 is a vector of coefficients corresponding to a learned importance for each of the features in the vector of features 360. In some aspects, the learned importance can be indicated by a set of weights 319, where some or all of the features in the vector of features 360 are assigned a corresponding weight value that indicates the learned importance of the feature. In some embodiments, to calculate a score, a dot product of the feature vector 315 and the vector of coefficients of the model 318 is calculated.

Figure 4:
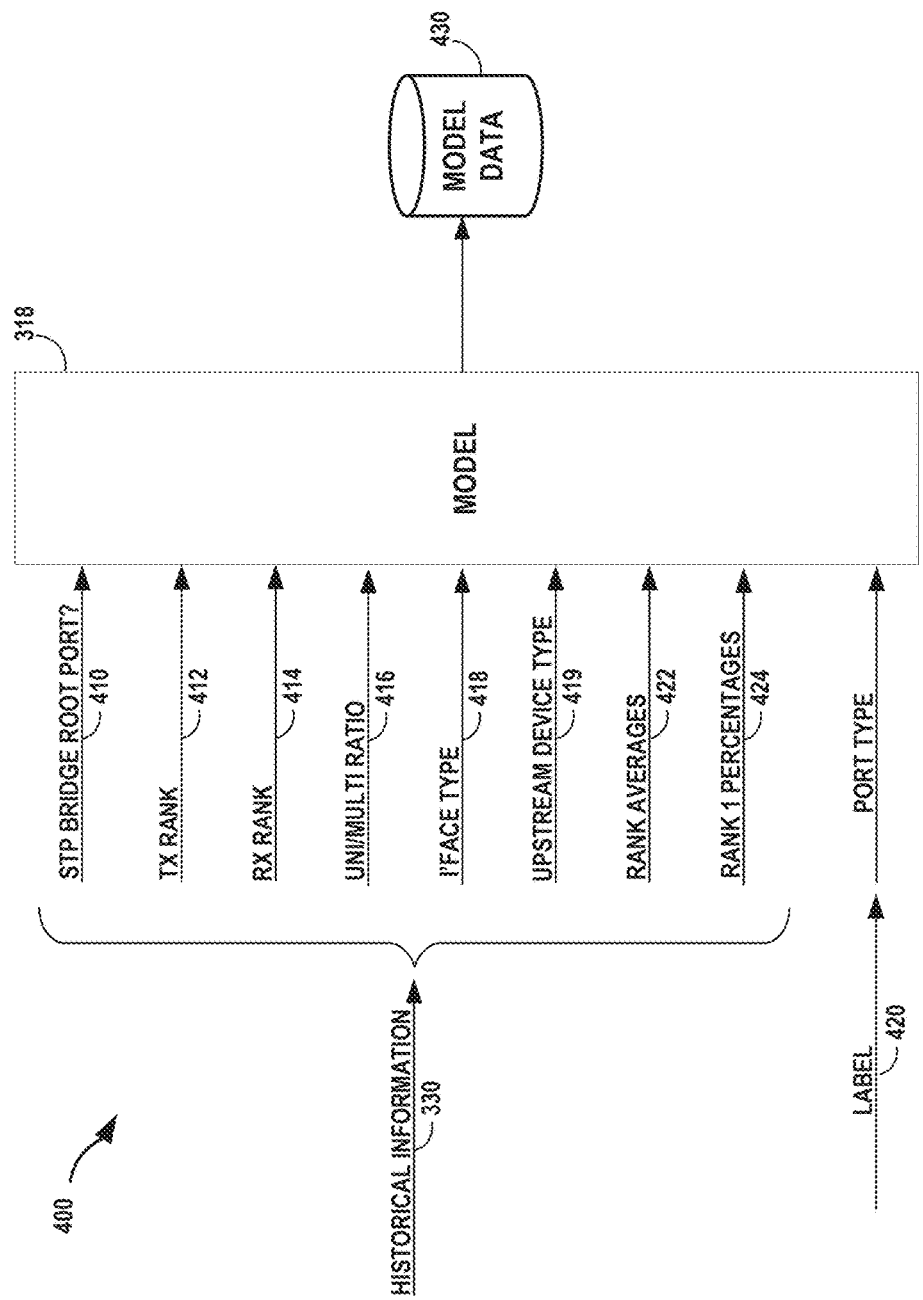
FIG. 4 shows data flow of a model training process in accordance with one or more aspects of the disclosure.

FIG. 4 shows data flow of a model training process 400 in accordance with one or more aspects of the disclosure. FIG. 4 shows the model 318 of FIG. 3. FIG. 3 also shows historical information 330. In some aspects, historical information 330 includes an STP bridge root port indicator 410 (e.g., having a similar or equivalent structure as field 208 in some embodiments), transmit rank indicator 412 (e.g., having a similar or equivalent structure as field 212 in some embodiments), receive rank indicator 414 (e.g., having a similar or equivalent structure as field 214 in some embodiments), unicast/multi-cast ratio rank indicator 416 (e.g., having a similar or equivalent structure as field 216 in some embodiments), an interface type indicator 418 (e.g., having a similar or equivalent structure as field 210 in some embodiments), an upstream device type indicator 419 (e.g., having a similar or equivalent structure as field 209 in some embodiments), rank averages 422 (e.g., having a similar or equivalent structure as fields 218A-218L in some embodiments), and/or rank one percentages 424 (e.g., having a similar or equivalent structure as fields 219A-219M in some embodiments). The model training process 400 can also include a label 420 for the provided historical information 330. In some aspects, label 420 can be a port type associated with the historical information 330 for a port. Model training process 400 uses model 318 to generate model data 430 based on the historical information 330 and the label 420. The model data 430 represents associations, generated by the model 318, between historical information 330 for a plurality of ports and their associated labels 420. In various embodiments, the port type label 420 indicates whether the historical information 330 indicates the port is an uplink port, downlink port, internal network port, file server port, mail server port, web server port, or other port type. An uplink port in this context is not intended to imply that the port experiences unidirectional data. Instead, the use of uplink port here is generally used to refer to, at least in some aspects, to a port responsible for carrying data to a larger network, such as the Internet, than that of other ports of the switch. In some environments, an uplink port carries data between a corporate or enterprise network and an Internet service provider network. For example, network port 104F described above with respect to FIG. 1 is considered an uplink port in some embodiments, since the network port 104F carries data between the multi-port network device 102 to the Internet 106F. A downlink port can refer to a port that is not an uplink port. For example, an aggregation switch may connect with multiple edge switches. In this case, all ports from the aggregation switch connecting to edge switches are considered as downlink ports for the aggregation switch.

When training the model 318, the port type label 420 indicates a port type associated with other input values, such as the indicators 410, 412, 414, 416, 418, and/or 419. Label 420, in some aspects, can be considered the "ground truth" with respect to the port type associated with indicators 410, 412, 414, 416, 418, and/or 419. In other aspects, when employing the model 318 to classify network traffic on a particular port of a switch, the label 420 may be considered as only an advisory indication by the model 318, but may not be authoritative with respect to the historical information being provided via the traffic profile information 390.

Figure 5:
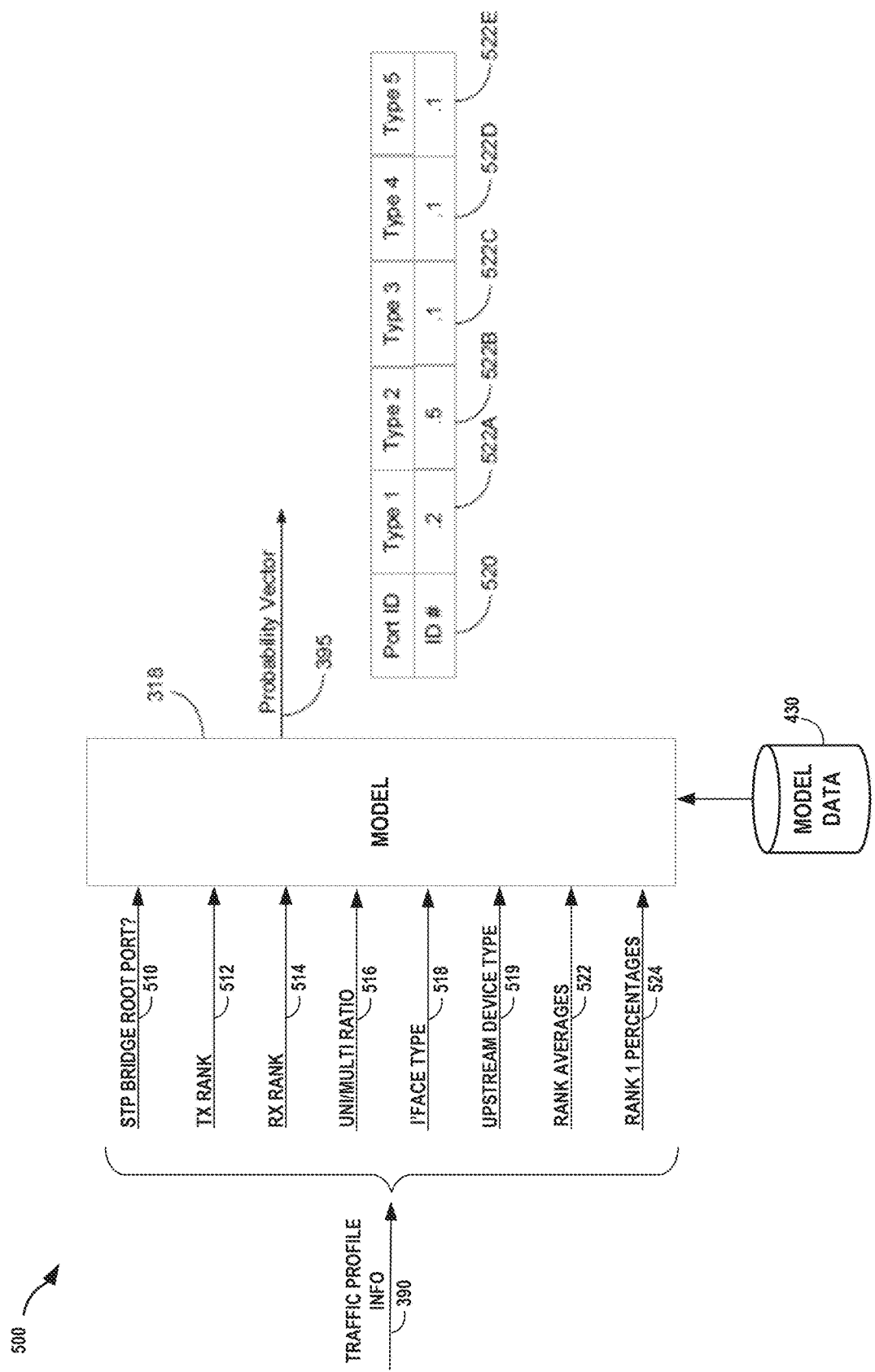
FIG. 5 shows an example data flow of a process that classifies a port on a multi-port network device, in accordance with one or more aspects of the disclosure.

FIG. 5 shows an example data flow 500 of a process that classifies a port on a multi-port network device, in accordance with one or more aspects of the disclosure. FIG. 5 shows one embodiment of the model 318. The model 318 receives traffic profile information 390 and generates a probability vector 395. The model 318 generates the probability vector 395 based, in part, on the traffic profile information 390 and the model data 430, which is generated during a model training process, such as the model training process 400 discussed above. The traffic profile information 390 include data characterizing network traffic over a particular port. In some embodiments, the traffic profile information 390 corresponds to information included in the traffic information section 204 of message portion 200. While FIG. 5 shows the traffic profile information 390 flowing directly into the model 318, in some embodiments, the traffic profile information 390 may be pre-processed into features, such as the feature vector 315 discussed above with respect to FIG. 3, before being provided to the model 318. The traffic profile information 390 includes, in various embodiments, one or more of an STP bridge root port indication 510 (similar or equivalent to STP bridge root port field 208 of message portion 200 in some embodiments), transmit rank 512 (similar or equivalent to transmit rank field 212 of message portion 200 in some embodiments), receive rank 514 (similar or equivalent to receive rank field 214 of message portion 200 in some embodiments), unicast/multicast ratio rank indicator 516 (similar or equivalent to unicast/multicast ratio field 216 of message portion 200 in some embodiments), interface type indicator 518 (similar or equivalent to interface type field 210 in some embodiments), upstream device type indicator 519 (e.g., similar or equivalent to upstream device type field 209 in some embodiments), rank averages 522 (e.g., having a similar or equivalent structure as fields 218A-218L in some embodiments), and/or rank one percentages 524 (e.g., having a similar or equivalent structure as fields 219A-219M in some embodiments).

Based on the traffic profile information 390, the model 318 generates a probability vector 395. The probability vector 395 indicates a plurality of probabilities 522A-E. Each of the probabilities 522A-E represent a probability that traffic over the port is characterized as a corresponding link type. The probability vector 395 also includes a port identifier value 520. Thus, as an example, a first probability 522A represents, in some embodiments, a probability that the traffic is exchanged between the port of the multi-port network device identified by the port identifier value 520 is an uplink port (e.g., a port that communicatively couples the multi-port network device to a larger, public network). A second probability 522B represents, in some embodiments, a second probability that the traffic is exchanged between the port and a server such as an email server. A third probability 522C represents, in some embodiments, a third probability that the traffic is exchanged between the port and a client workstation Thus, the various probabilities represented by the probability vector indicate probabilities that the port is, in some embodiments, one or more of an uplink port, downlink port, mail server port, file server port, secondary enterprise site port, single user workstation port, or other port types as defined by labels provided during training of the model 318.

Figure 6:
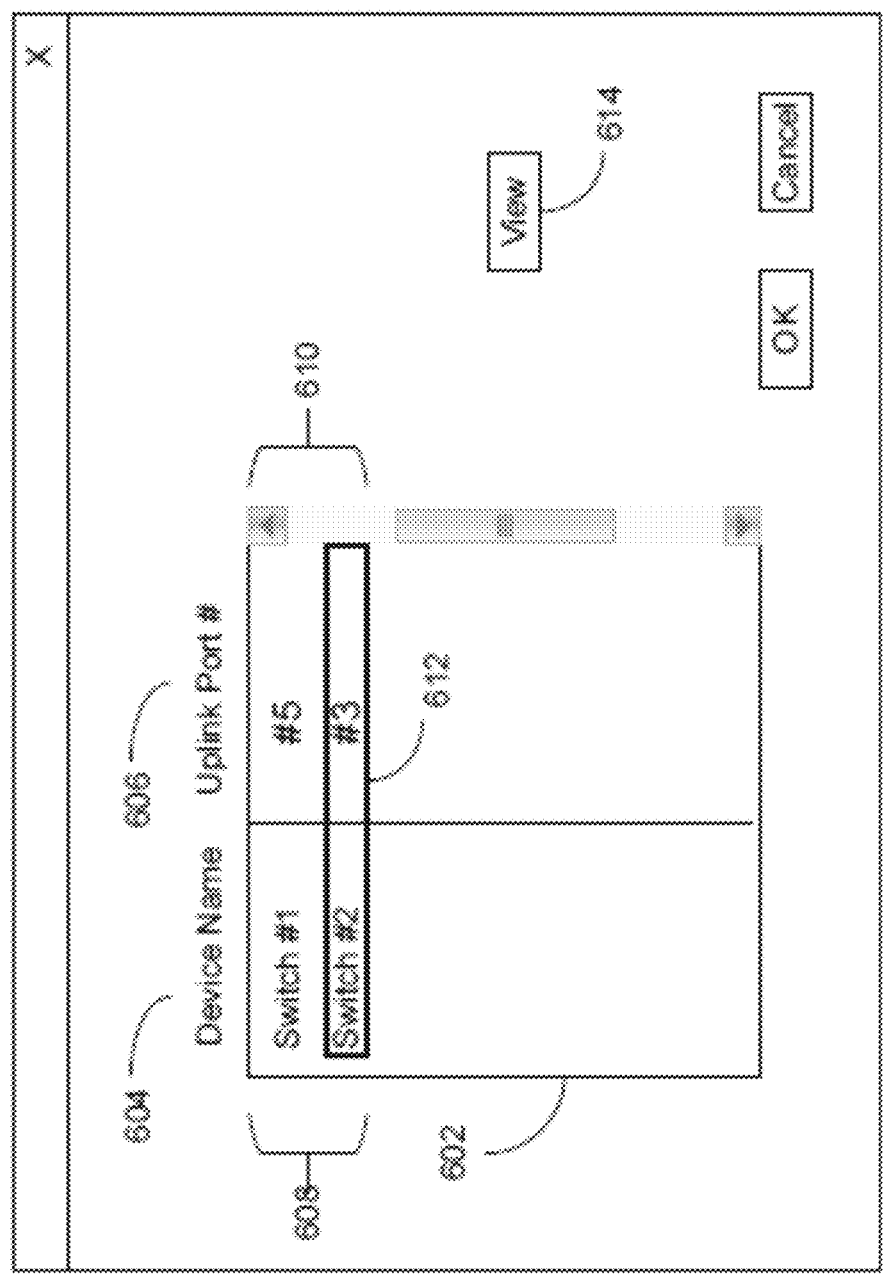
FIG. 6 shows an example user interface in accordance with one or more aspects of the disclosure.

FIG. 6 shows an example user interface 600 in accordance with one or more aspects of the disclosure. The example user interface 600 includes a UI list control 602 that includes a device name column 604 and an uplink port number column 606. The device name column 604 displays a plurality of multi-port network devices 608, which are each identified by a name. The uplink port number column 606 displays a plurality of uplink port numbers 610, with each of the uplink port numbers corresponding to one of the plurality of multi-port network devices 608 identified by the device name column 604.

Some embodiments provide for highlighting or selecting an entry 612 of a particular device name of the plurality of multi-port network devices 608. As shown, "switch #2" is selected. Selection of a control 614 then opens a details window for the entry 612 that is selected. This detailed window is described below with respect to FIG. 7.

Figure 7:
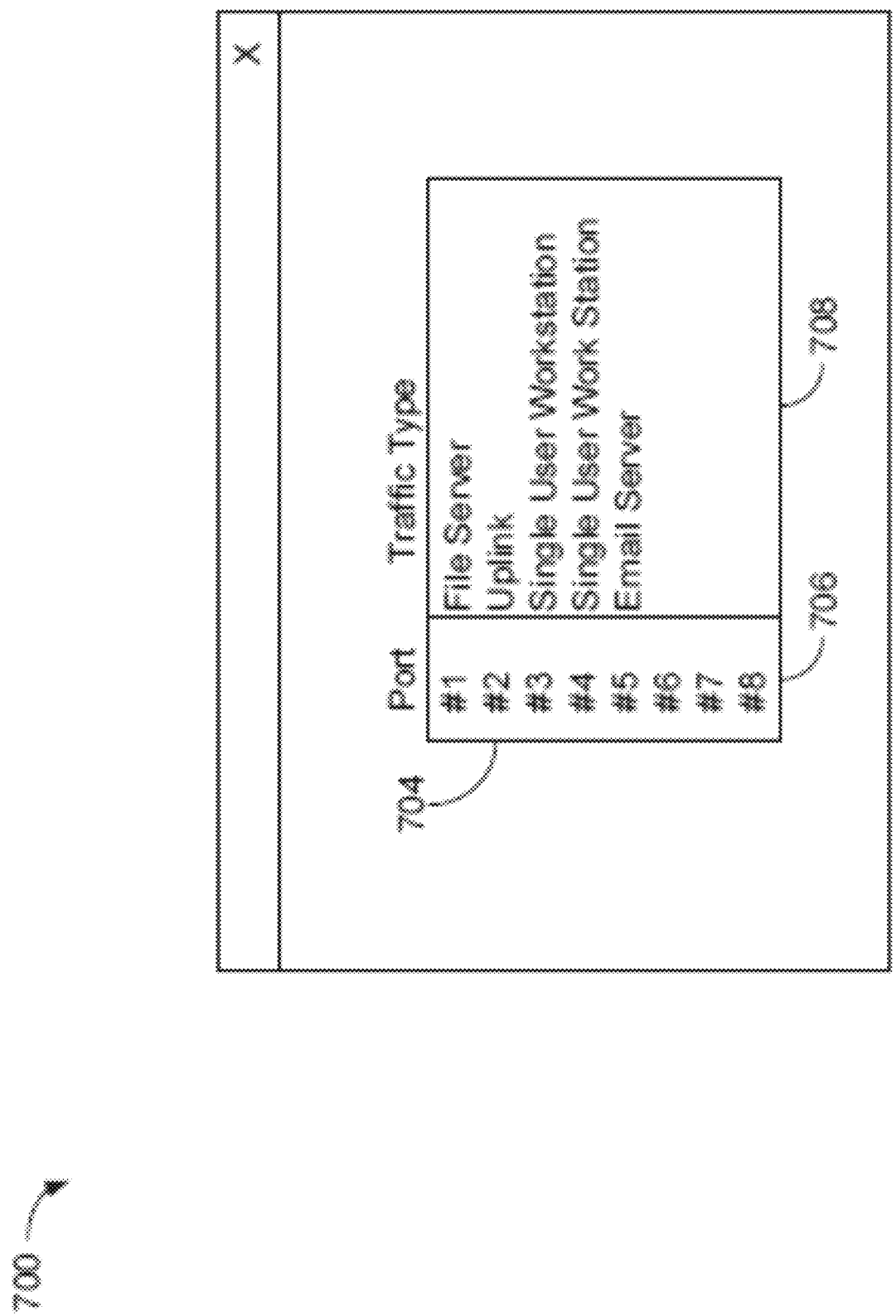
FIG. 7 shows another example user interface in accordance with one or more aspects of the disclosure.

FIG. 7 shows another example user interface 700 in accordance with one or more aspects of the disclosure. The user interface 700 is one embodiment of a user interface that opens upon selection of the control 614 discussed above with respect to FIG. 6. The user interface 700 displays an edit control 704 that includes a port column 706 and a traffic type column 708. In some embodiments, the information displayed in the port column 706 and/or the traffic type column 708 is obtained from output of the model 318. For example, the data displayed in the traffic type column 708 is derived, in at least some embodiments, from the probability vector 395. For example, in some embodiments, the model 318 is invoked for each port of a multi-port network device, and a separate probability vector 395 is generated by the model 318 for each port of the device. A traffic type having a highest probability in the probability vector 395 is then displayed in the traffic type column 708 horizontally proximate to the port displayed in the port column 706.

Figure 8:
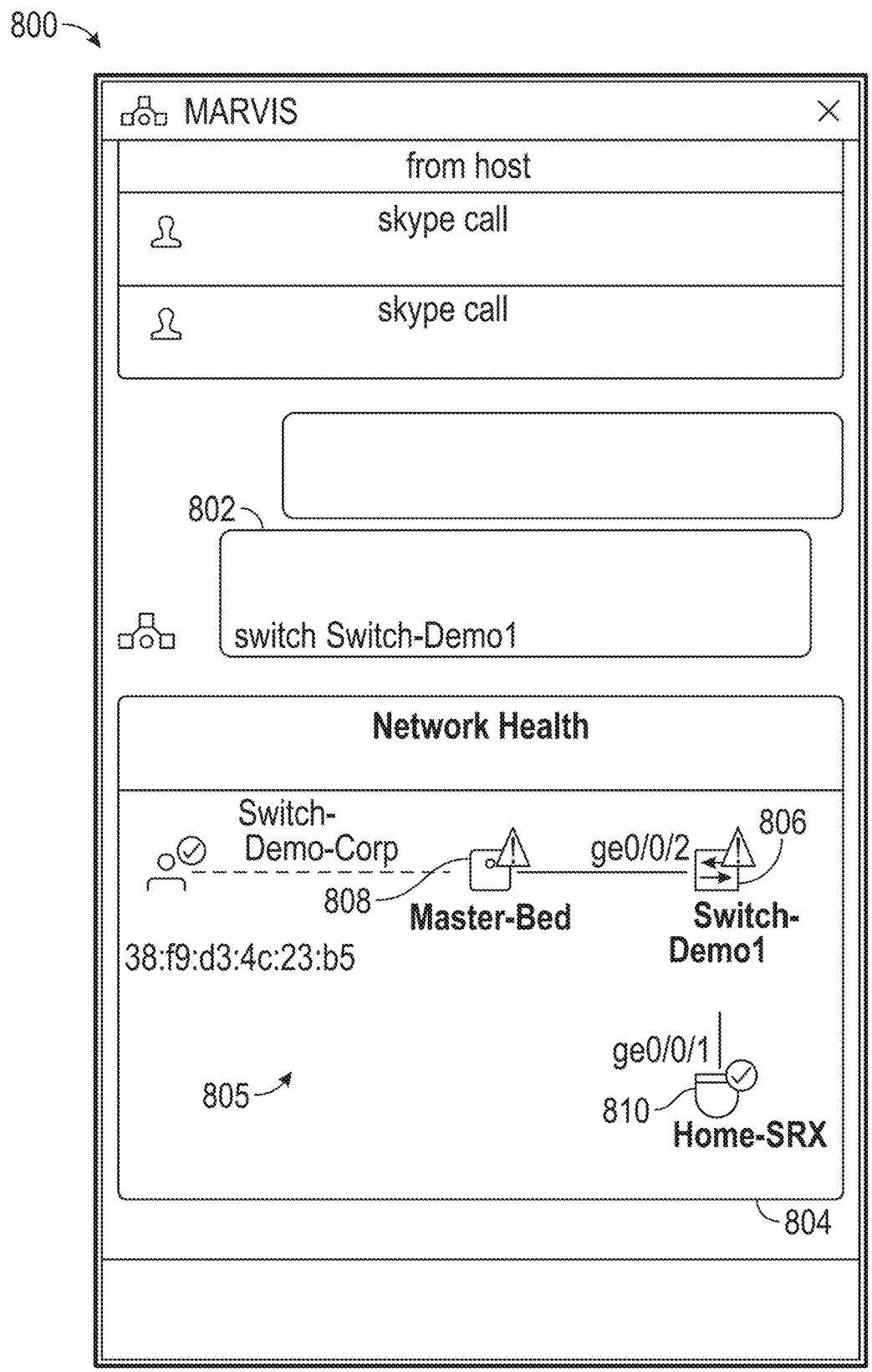
FIG. 8 shows a further example user interface in accordance with one or more aspects of the disclosure.

FIG. 8 shows a further example user interface 800 in accordance with one or more aspects of the disclosure. The user interface 800 is an example of a network support user interface that is designed to assist a support technician with diagnosing or troubleshooting a technical problem. The user interface 800 shows a message 802 indicating a user had a problem with high CPU utilization. The user interface 800 also includes a network health window 804 that includes a map of a network topology 805 relevant to the problem described in the message 802. The network topology illustrates three network nodes, including a switch 806, a second node 808, and a third node 810. In some embodiments, the network topology 805 is generated, at least in part, based on the probability vector 395 discussed above. For example, the network topology 805 is generated based on which port of the switch 806 is determined to be an uplink port. In the example shown in FIG. 8, the uplink port is determined to be connected to the third node 810, which effects how the network topology 805 is displayed. Similarly, a second port of the switch 806 is characterized so as to be compatible with a connection between the switch 806 and the second node 808.

Figure 9:
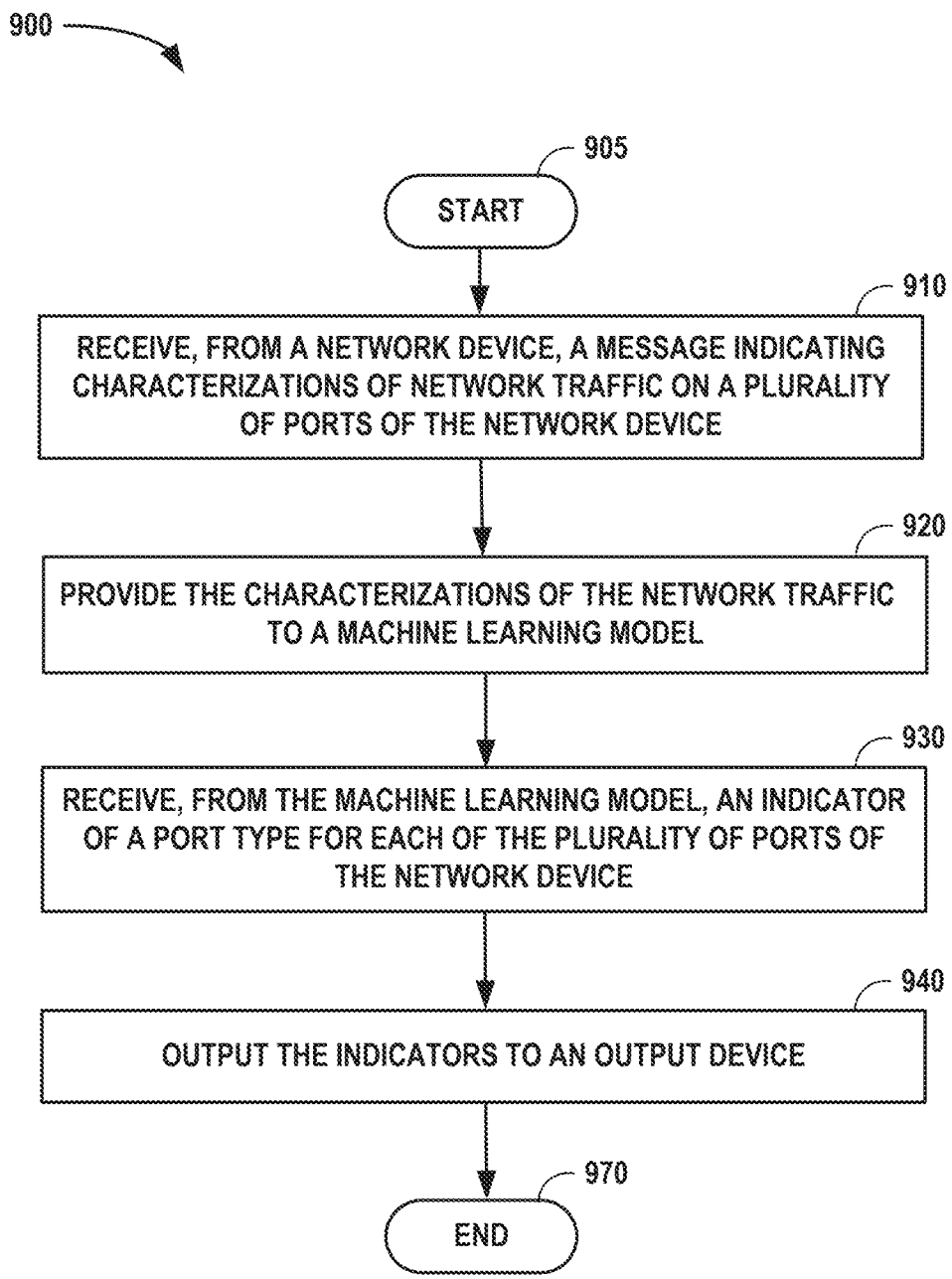
FIG. 9 is a flowchart of a method for classifying traffic flowing over a plurality of ports of a multi-port network device in accordance with one or more aspects of the disclosure.

FIG. 9 is a flowchart of a method 900 for classifying traffic flowing over a plurality of ports of a multi-port network device in accordance with one or more aspects of the disclosure. In some embodiments, one or more of the functions or operations discussed below with respect to FIG. 9 are performed by hardware processing circuitry. For example, in some embodiments, instructions stored in one or more electronic memories configure the hardware processing circuitry to perform one or more operations discussed below with respect to FIG. 9. In some embodiments, method 900 is performed by the classification system 106E, discussed above with respect to FIG. 1.

After start operation 905, method 900 moves to operation 910. In operation 910, a message is received from a multi-port network device. For example, as described above with respect to FIG. 1, the multi-port network device 102 sends traffic information 108 to the classification system 106E. Operation 910 then decodes or parses the received message to identify one or more characterizations or indicators of characterizations of traffic processed by the multi-port network device. In some embodiments, the message indicates characterizations of a plurality of ports of the multi-port network device. In these embodiments, the message is decoded to determine these characterizations. In some embodiments, the message received in operation 910 includes one or more of the fields of message portion 200 discussed above with respect to FIG. 2.

In operation 920, the characterizations of the network traffic are provided to a machine learning model. For example, as illustrated in FIG. 5, some embodiments provide a model (e.g., 318) with one or more characterization of traffic over a port of a multi-port network device. These characterizations include one or more of an STP bridge root port indicator (e.g., 510), a transmit rank indicator (e.g., 512), a receive rank indicator (e.g., 514), a unicast/multi-cast indicator (e.g., 516), an interface type indicator (e.g., 518), an upstream device type indicator (e.g., 519), rank averages (e.g., 522) and/or rank one percentages (e.g., 524).

In operation 930, an indicator of a port type is obtained or received from the machine learning model. In some embodiments, operation 930 includes receiving a plurality of indicators of port type, with each of the plurality of indicators indicating a port type of a different port of the multi-port network device. For example, as discussed above with respect to FIG. 5, in some embodiments, a probability vector (e.g., 395) is received from the machine learning model (e.g., 318). Some embodiments of operation 930 receive a plurality of probability vectors, a separate probability vector for each of the plurality of network ports of the multi-port network device. Each probability vector indicates probabilities that the respective port is a particular type of port.

In operation 940, one or more of the indicators obtained in operation 930 is output to an output device. For example, as discussed above with respect to the user interfaces 600 and/or 700, some embodiments generate a user interface that displays the indicated port types via a user interface. For example, the port types provided in uplink port number column 606 and/or traffic type column 708 are based on the indicators obtained from the machine learning model in operation 930.

After operation 940, method 900 moves to end operation 970.

Figure 10:
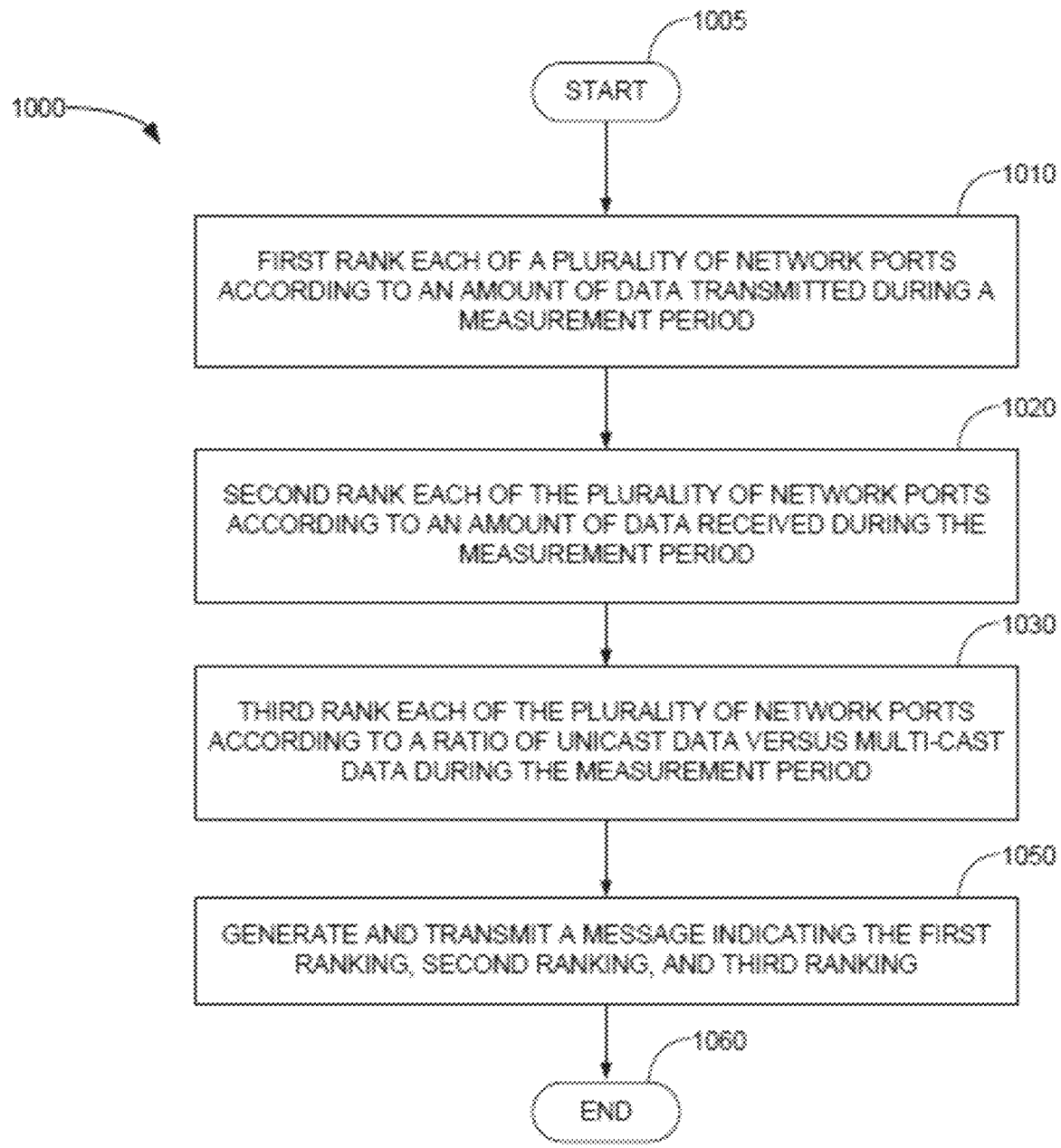
FIG. 10 is a flowchart of a method for generating traffic information in accordance with one or more aspects of the disclosure.

FIG. 10 is a flowchart of a method for generating traffic information in accordance with one or more aspects of the disclosure. In some embodiments, one or more of the functions or operations discussed below with respect to FIG. 10 are performed by hardware processing circuitry. For example, in some embodiments, instructions stored in one or more electronic memories configure the hardware processing circuitry to perform one or more operations discussed below. In some embodiments, method 1000 is performed by the multi-port network device 102, discussed above with respect to FIG. 1.

After start operation 1005, method 1000 moves to operation 1010, where a first rank of a plurality of network ports is determined. The first ranking relates to an amount of data transmitted by each of the plurality of network ports. As discussed above with respect to FIG. 2, how the amount of data transmitted is determined varies by embodiment, but some embodiments include all data transmitted, while other embodiments include less than all data transmitted (e.g., excluding protocol headers, management data, or other data). The first ranking of the plurality of ports is determined for a measurement time period. The measurement time period varies by embodiments, but can be any time period, including one second, two seconds, five seconds, thirty (30) seconds, one minute, two minutes, five minutes, ten minutes, fifteen minutes, thirty minutes, or any time period. The plurality of network ports are analogous, at least in some embodiments, to the plurality of network ports 104A-F discussed above with respect to FIG. 1.

In operation 1020, the plurality of ports are second ranked according to an amount of data received during the measurement period. As discussed above with respect to, for example, field 214 of the message portion 200, the amount of data received includes all data received in some embodiments, and includes less than all the data received during the measurement period in some embodiments. As discussed, some embodiments exclude protocol header traffic and/or management data from the amount of data received and/or by implication, the second ranking.

In operation 1030, the plurality of ports are third ranked according to a ratio of unicast data versus multi-cast data on the port. In various embodiments, the ratio considers transmitted data, received data, or both transmitted and received data.

In operation 1050, a message indicating the first ranking, second ranking, and third ranking of operations 1010, 1020, and 1030 respectively, is generated and transmitted. In some embodiments, the message is transmitted to a classification system, such as the classification system 106E, discussed above with respect to FIG. 1.

Some embodiments of method 1000 include generating any one or more of the fields discussed above with respect to message portion 200, and including those fields in the message of operation 1050. For example, some embodiments of method 1000 include storing the first, second, and/or third rankings. When the message of operation 1050 is generated, multiple rankings from multiple previous measurement periods are also included in the message. For example, as discussed above with respect to fields $220_1$-$220_n$, $222_1$-$222_n$, and $224_1$-$224_n$, some embodiments generate and transmit a time series of ranking values. The time series of ranking values, along with other ranking measurements, may be used to generate rank averages $218_1$-$218_1$ and rank one percentages $219_1$-$219_m$. For example, the averages of the ranks over the time series may be used to determine a rank average 218. Similarly, the time series of ranks may be scanned to determine rank once percentages 219. A sequence of messages generated and transmitted by multiple invocations of method 1000 thus present, in some embodiments, a moving window of ranking information in the sequence of messages.

After operation 1050, method 1000 moves to end operation 1060.

Figure 11:
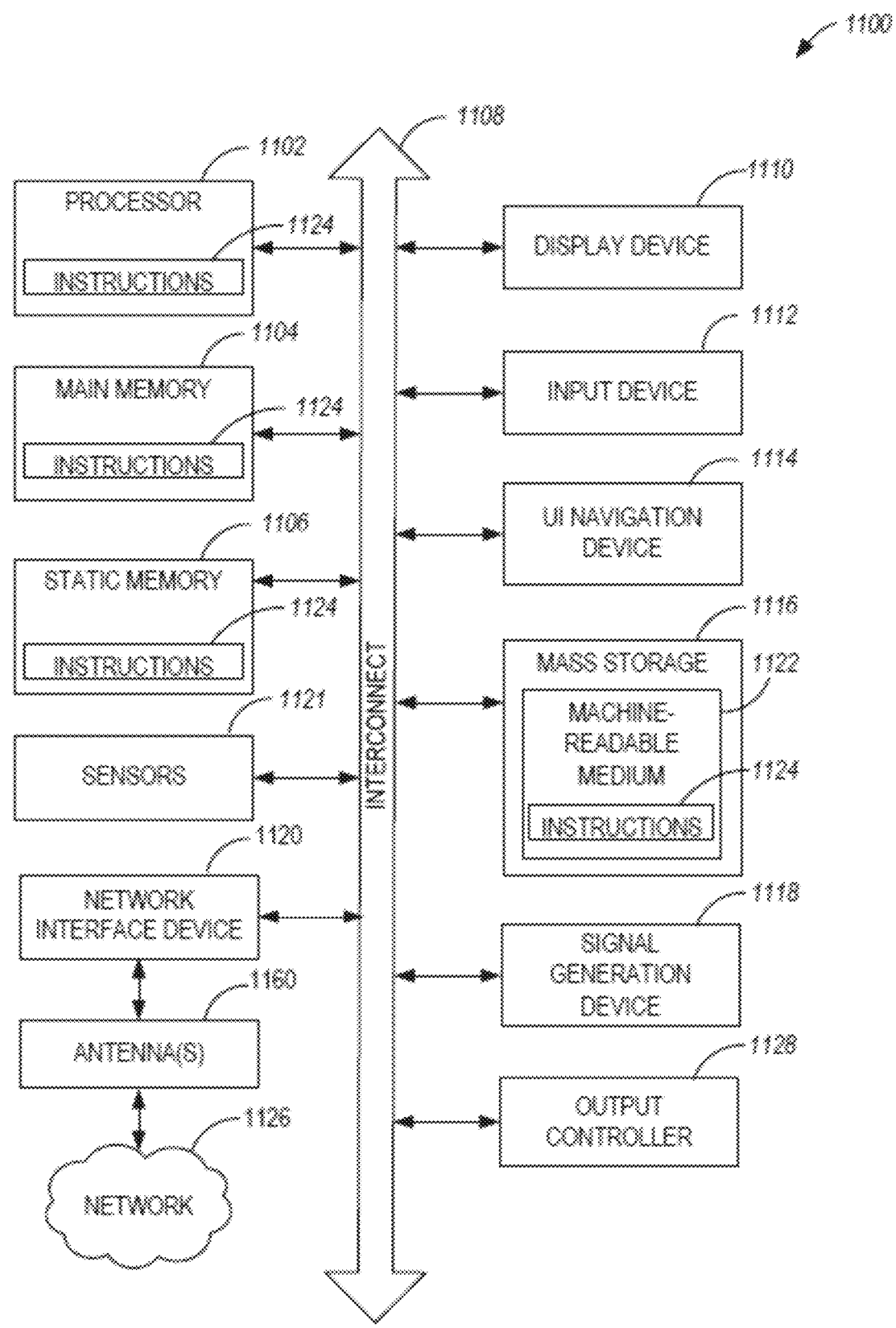
FIG. 11 illustrates a block diagram of an example machine upon which any one or more of the techniques (e.g., methodologies) discussed herein may perform.

FIG. 11 illustrates a block diagram of an example machine 1100 upon which any one or more of the techniques (e.g., methodologies) discussed herein may perform. Machine 1100 (e.g., a computer system) may include processing circuitry such as hardware processor 1102 (e.g., a central processing unit (CPU), a graphics processing unit (GPU), a hardware processor core, or any combination thereof), a main memory 1104 and a static memory 1106, some or all of which may communicate with each other via an interlink 1108 (e.g., bus). In some embodiments, the machine 1100 represents the multi-port network device 102. In other embodiments, the machine 100 represents the classification system 106E.

Specific examples of main memory 1104 include Random Access Memory (RAM) and semiconductor memory devices, which may include, in some embodiments, storage locations in semiconductors such as registers. Specific examples of static memory 1106 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1100 may further include a display device 1110, an input device 1112 (e.g., a keyboard), and a user interface (UI) navigation device 1114 (e.g., a mouse). In an example, the display device 1110, input device 1112 and UI navigation device 1114 may be a touch screen display. The machine 1100 may additionally include a mass storage device 1116 (e.g., drive unit), a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the hardware processor 1102 and/or instructions 1124 may comprise processing circuitry and/or transceiver circuitry.

The mass storage device 1116 may include a machine-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the mass storage device 1116 may constitute machine-readable media.

Specific examples of machine-readable media may include non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine-readable medium 1122 is illustrated as a single medium, the term "machine-readable medium" may include a single medium or multiple media (e.g., a centralized or distributed database, and/or associated caches and servers) configured to store the instructions 1124.

An apparatus of the machine 1100 may be one or more of a hardware processor 1102 (e.g., a central processing unit (CPU), a graphics processing unit (GPU), a hardware processor core, or any combination thereof), a main memory 1104 and a static memory 1106, one or more sensors 1121, network interface device 1120, one or more antennas 1160, a display device 1110, an input device 1112, a UI navigation device 1114, a mass storage device 1116, instructions 1124, a signal generation device 1118, and an output controller 1128. The apparatus may be configured to perform one or more of the methods and/or operations disclosed herein. The apparatus may be intended as a component of the machine 1100 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine-readable media may include non-transitory machine-readable media. In some examples, machine-readable media may include machine-readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1120 may include one or more physical jacks (e.g., Ethernet, coaxial, or phone jacks) or one or more antennas to connect to the communications network 1126. In an example, the network interface device 1120 may include one or more antennas 1160 to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques. The term "transmission medium" shall be taken to include any intangible medium that is capable of storing, encoding, or carrying instructions for execution by the machine 1100, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

What is claimed is:

1. A computer system comprising:
memory; and
one or more processors configured to:
obtain, from a network device, a plurality of information of network traffic on each port of a plurality of ports of the network device during one or more measurement periods;
determine, for each port of the plurality of ports of the network device, an indicator of a port type that corresponds to a type of network traffic carried by the port based on the plurality of information of network traffic on the port for the one or more measurement periods, wherein the port type indicates a type of connection to a type of device with which the port of the network device exchanges network traffic; and
provide the indicator of the port type for at least the port to a second computer system to enable configuration of the port of the network device in accordance with the port type for the port.

2. The computer system of claim 1, wherein to determine for each port of the plurality of ports of the network device the indicator of the port type, the one or more processors are configured to:
provide the plurality of information of network traffic on each port of the plurality of ports of the network device as input to a machine learning model; and
receive, as output from the machine learning model, the indicator of the port type for each port of the plurality of ports of the network device.

3. The computer system of claim 1, wherein the one or more measurement periods comprise at least two measurement periods including a most recent measurement period and a previous measurement period.

4. The computer system of claim 1, wherein the type of connection to the type of device with which the port of the network device exchanges network traffic comprises one of an uplink or a downlink to one of a mail server, a file server, a secondary enterprise site, or a single user workstation.

5. The computer system of claim 1, wherein the plurality of information of network traffic on each port of the plurality of ports of the network device includes one or more indications characterizing the network traffic on each port of the plurality of ports during the one or more measurement periods.

6. The computer system of claim 1, wherein the one or more measurement periods comprise first measurement periods and the port type comprises a first port type, and wherein the one or more processors are configured to:
receive a plurality of information of network traffic on each port of the plurality of ports of the network device during one or more second measurement periods that include a most recent measurement period;
determine an indicator of a second port type that corresponds to the type of network traffic carried by the port based on the plurality of information of network traffic on the port for the one or more second measurement periods, wherein the second port type is different than the first port type; and
provide the indicator of the second port type for at least the port to the second computer system to enable configuration of the port of the network device in accordance with the second port type for the port.

7. The computer system of claim 1, wherein the plurality of information of network traffic on each port of the plurality of ports of the network device comprises a ranking of the port with respect to other ports of the plurality of ports, and wherein to determine the indicator of the port type, the one or more processors are configured to determine the indicator of the port type based on the ranking of the port, wherein the ranking of the port comprises at least one of a ranking of an amount of data transmitted over the port relative to the other ports of the plurality of ports or a ranking of an amount of data received over the port relative to the other ports of the plurality of ports.

8. The computer system of claim 1, wherein the plurality of information of network traffic on each port of the plurality of ports of the network device comprises an indicator of whether the port is a root port of a spanning tree, and wherein to determine the indicator of the port type for the port, the one or more processors are configured to determine the indicator of the port type based on the indicator of whether the port is the root port.

9. The computer system of claim 1, wherein the plurality of information of network traffic on each port of the plurality of ports of the network device comprises an indicator of an interface type of the port, and wherein to determine the indicator of the port type for the port, the one or more processors are configured to determine the indicator of the port type based on the indicator of the interface type of the port.

10. The computer system of claim 1, wherein the plurality of information of network traffic on each port of the plurality of ports of the network device comprises a ratio between unicast data and multicast data over the port, and wherein to determine the indicator of the port type for the port, the one or more processors are configured to determine the indicator of the port type based on the ratio.

11. The computer system of claim 1, wherein the plurality of information of network traffic on each port of the plurality of ports of the network device comprises a rank average of the port with respect to a network traffic measurement, and wherein to determine the indicator of the port type for the port, the one or more processors are configured to determine the indicator of the port type based on the rank average.

12. The computer system of claim 1, wherein the plurality of information of network traffic on each port of the plurality of ports of the network device comprises a rank one percentage of the port with respect to a network traffic measurement, and wherein to determine the indicator of the port type for the port, the one or more processors are configured to determine the indicator of the port type based on the rank one percentage.

13. A method, comprising:
obtaining, from a network device and by a first computer system, a plurality of information of network traffic on each port of a plurality of ports of the network device during one or more measurement periods;

determining, by the first computer system, for each port of the plurality of ports of the network device, an indicator of a port type that corresponds to a type of network traffic carried by the port based on the plurality of information of network traffic on the port for the one or more measurement periods, wherein the port type indicates a type of connection to a type of device with which the port of the network device exchanges network traffic; and providing, by the first computer system, the indicator of the port type for at least the port to a second computer system to enable configuration of the port of the network device in accordance with the port type for the port.

14. The method of claim 13, wherein determining for each port of the plurality of ports of the network device the indicator of the port type comprises:

providing the plurality of information of network traffic on each port of the plurality of ports of the network device as input to a machine learning model; and receiving, as output from the machine learning model, the indicator of the port type for each port of the plurality of ports of the network device.

15. The method of claim 13, wherein the one or more measurement periods comprise at least two measurement periods including a most recent measurement period and a previous measurement period.

16. The method of claim 13, wherein the type of connection to the type of device with which the port of the network device exchanges network traffic comprises one of an uplink or a downlink to one of a mail server, a file server, a secondary enterprise site, or a single user workstation.

17. The method of claim 13, wherein the plurality of information of network traffic on each port of the plurality of ports of the network device includes one or more indications characterizing the network traffic on each port of the plurality of ports during the one or more measurement periods.

18. The method of claim 13, wherein the one or more measurement periods comprise first measurement periods and the port type comprises a first port type, the method further comprising:

receiving a plurality of information of network traffic on each port of the plurality of ports of the network device during one or more second measurement periods that include a most recent measurement period;

determining an indicator of a second port type that corresponds to the type of network traffic carried by the port based on the plurality of information of network traffic on the port for the one or more second measurement periods, wherein the second port type is different than the first port type; and providing the indicator of the second port type for at least the port to the second computer system to enable configuration of the port of the network device in accordance with the second port type for the port.

19. Non-transitory computer-readable storage media having stored thereon instructions, that when executed, cause one or more processors to:

obtain a plurality of information of network traffic on each port of a plurality of ports of a network device during one or more measurement periods;

determine, for each port of the plurality of ports of the network device, an indicator of a port type that corresponds to a type of network traffic carried by the port based on the plurality of information of network traffic on the port for the one or more measurement periods, wherein the port type indicates a type of connection to a type of device with which the port of the network device exchanges network traffic; and provide the indicator of the port type for at least the port to a computer device to enable configuration of the port of the network device in accordance with the port type for the port.

20. The non-transitory computer-readable storage media of claim 19, wherein to determine for each port of the plurality of ports of the network device the indicator of the port type, the instructions cause the one or more processors to:

provide the plurality of information of network traffic on each port of the plurality of ports of the network device as input to a machine learning model; and receive, as output from the machine learning model, the indicator of the port type for each port of the plurality of ports of the network device.

* * * * *